(No Model.) 2 Sheets—Sheet 1.
T. VOGEL.
APPARATUS FOR MAKING YEAST.
No. 417,611. Patented Dec. 17, 1889.
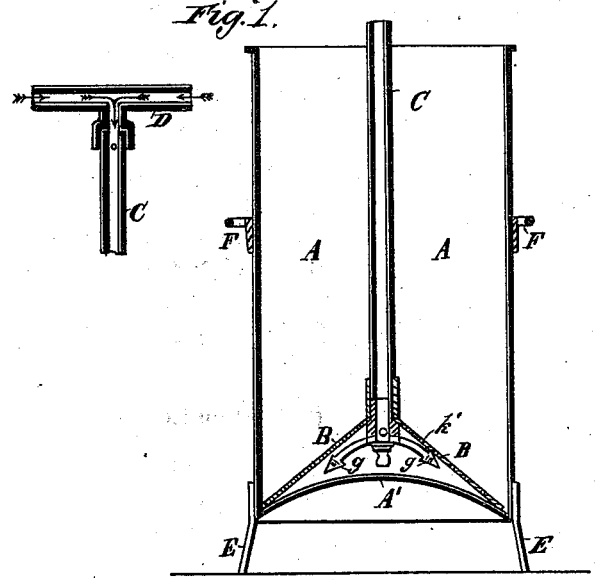
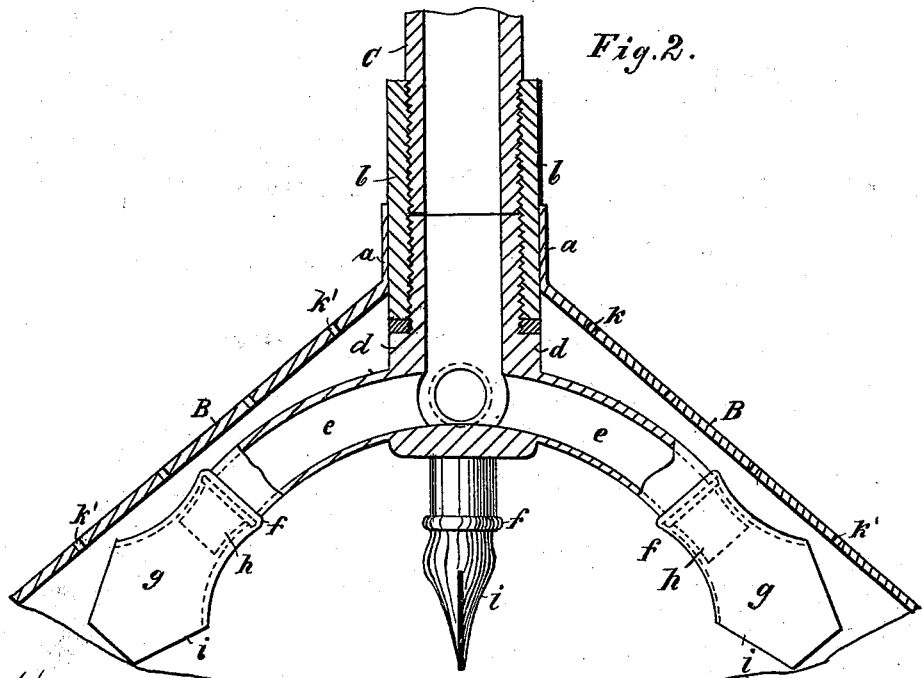

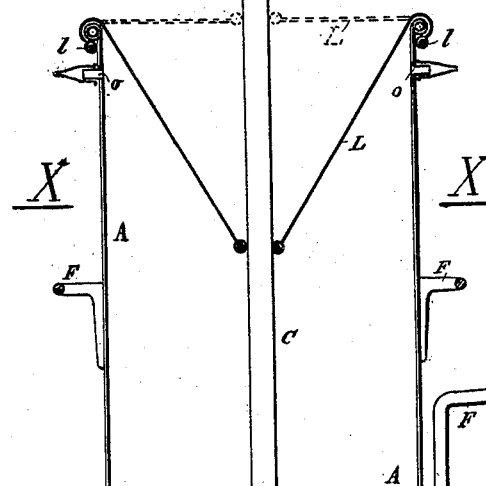

UNITED STATES PATENT OFFICE.

THEODOR VOGEL, OF SAALFELD, GERMANY.

APPARATUS FOR MAKING YEAST.

SPECIFICATION forming part of Letters Patent No. 417,611, dated December 17, 1889.

Application filed August 23, 1889. Serial No. 321,804. (No model.)

*To all whom it may concern:*

Be it known that I, THEODOR VOGEL, a subject of the Duke of Sachsen-Meiningen, German Empire, residing at Saalfeld, in Thüringen, Dukedom of Sachsen-Meiningen, German Empire, have invented new and useful Improvements in Apparatus for Fermentation of Yeast, of which the following is a specification.

The devices made use of for aerating yeast are all based on the principle of forcing air in a finely-divided state into the yeast and mixing the air very intimately with the latter. To realize this object numerous arrangements have been devised, which, however, all more or less possess the defect of rendering a thorough cleaning of the apparatus after use exceedingly laborious or quite impossible because of the difficulty experienced in reaching the several parts of the apparatus. The aforesaid defect is obviated in the improved apparatus constructed according to the present invention, as the several parts of this apparatus can be readily taken apart for cleaning purposes.

A further advantage is realized in one form or modification of the apparatus, which enables the air which is to be mixed with the yeast to be purified or sterilized prior to the mixing, which is of considerable importance.

In the drawings, Figure 1 is a central vertical section of my apparatus. Fig. 2 is an enlarged detail section view of the air-valves. Fig. 3 is a central vertical section illustrating a modification of the aerating mechanism. Fig. 4 is a section on the line $xx$, Fig. 3. Fig. 5 is a section on the line $yy$, Fig. 3; and Fig. 6 is a detail view of the air-valves.

My improved apparatus comprises a cylindrical vessel A, having an inwardly-dished bottom A', which vessel is provided with feet E and can be easily moved from place to place by means of lateral handles F. In the vessel is placed a funnel-shaped piston B, the funnel of which has elongated holes $k'$, arranged in circles. The piston is fixed to the piston-rod C, which has a handle D at its upper end. In Fig. 1 the said piston-rod and handle are hollow, so that the air has access to the apparatus through them. The piston-rod is fixed in the piston by means of an internally-screw-threaded socket $b$, secured to a tubular part $a$ of the piston, the piston-rod being screwed about half-way into the said socket. Into the lower end of this socket is screwed the tubular part $d$ of an air-distributing device $g$. In the cylindrical part of said air-distributing device $g$, which is made thicker at the lower end, terminate four brass tubes $e$, which are arranged crosswise and provided with collars $h$. Each of the said tubes is adapted to receive at its free end an india-rubber valve consisting of a tubular neck $f$, which is slid upon the brass tube, and a mouth-shaped prolongation $i$, having its lips split open in the front. In the state of repose these lips fit tightly upon each other.

In a modification shown in Figs. 3, 4, 5, and 6 the air-distributing device is fixed from the inside of the vessel in the bottom of the latter. In this case the open end of the socket terminates in a cylindrical chamber K, secured to the under side of the bottom of the above-mentioned vessel and receiving a short pipe $k$. This chamber contains filtering material (such as wadding) interposed between wire-gauze screens $m$ and $n$, which, by means of pins on the tight-fitting cover of the chamber, is pressed against the filtering material and against an annular flange in the chamber.

In the aforesaid modification the cylindrical vessel is closed at the top by an india-rubber plate L, which is put around the bent edge of the said vessel and has a thick annular part or collar $l$, for preventing the access of air to the interior of the vessel. The said india-rubber plate has also a thick annular part or collar at its center to surround the piston-rod, so that the air is also prevented at this point from entering the vessel. The interior of the vessel is therefore completely closed against the outer air. Lip-valves $o$, arranged in proximity to the upper end of the said vessel, permit the escape of air to the outside. In lieu of the described india rubber plate, a cover can be firmly secured on the vessel and provided with a stuffing-box for the piston-rod, as shown in dotted lines, Fig. 3.

The operation of the apparatus is as follows: After the said vessel has been half-filled with yeast the piston is moved up and down. When, in the apparatus shown in Figs. 1 and 2, the piston is moved upward, a vacuum is produced below the piston and through the hollow handle and piston-rod and the air-distributing device, (the valves of which allow air to escape, but not to enter,) air passes into the space below the piston, and yeast passes at the same time from above through the openings in the funnel and is now mixed with air. In the downward movement of the piston the valves of the air-distributing device are closed, and the yeast below the piston, which has already been mixed with air, must pass through the openings within said funnel above the latter. This operation is repeated in the next upward and downward movement of the piston. Air is therefore continually forced into the yeast, so that it will become intimately mixed with the particles of the yeast.

In the case of the modification of the apparatus shown in Figs. 3 to 6 the operation is as follows: The air, which has previously been purified, will in the upward movement of the piston pass into the said chamber below the bottom of the vessel, where any particles which it may contain are retained by the filter, and thence through the valves of the air-distributing device into the interior of the said vessel below the piston, where it is mixed with yeast. In the downward movement of the piston the aforesaid valves are closed, and the same operation takes place as above described.

Any superfluous air above the piston is ejected in the motion of the piston through the valves, which are arranged at the upper part of the vessel or on the cover of the latter.

In order to clean the above-described apparatus, which can be very easily effected, draw out the piston, screw the piston-rod from the socket, screw also the air-distributing device from the socket or from the bottom of the vessel, and clean the several parts separately.

The metallic parts of the apparatus are made of brass, tinned copper, or tin.

What I claim is—

1. In an apparatus for aerating yeast, the combination, with a vessel and a piston-head moving therein, provided with a series of annular perforations, of an air-distributing device opening into said vessel beneath the piston-head and provided with inwardly-opening valves, substantially as described.

2. In an apparatus for aerating yeast, the combination, with a vessel closed at its lower end, a perforated piston-head therein, and an air-distributing apparatus located between the bottom and the piston-head, of a hollow piston-rod connected with the piston-head and against the air-distributing device and serving as the supply-pipe for the air-distributing device, substantially as described.

3. The combination, with the piston-head B, air-distributing device $g$, vessel A, and piston-rod C, of the internally-screw-threaded socket $b$, serving as a means of connection for the said piston-head, piston-rod, and air-distributing device, substantially as described.

In witness whereof I have hereunto set my hand in presence of two witnesses.

THEODOR VOGEL.

Witnesses:
OTTO MORGENROTT,
F. STEPHANY.